United States Patent
Woodley

(10) Patent No.: US 7,805,353 B2
(45) Date of Patent: Sep. 28, 2010

(54) PORTFOLIO HEDGING METHOD

(75) Inventor: John A. C. Woodley, Westport, CT (US)

(73) Assignee: Morgan Stanley, New York, NY (US)

( * ) Notice: Subject to any disclaimer, the term of this patent is extended or adjusted under 35 U.S.C. 154(b) by 1889 days.

(21) Appl. No.: 09/863,148

(22) Filed: May 22, 2001

(65) Prior Publication Data

US 2002/0178111 A1 Nov. 28, 2002

(51) Int. Cl.
G06Q 40/00 (2006.01)

(52) U.S. Cl. .......... 705/37; 705/38; 705/36 R; 705/35

(58) Field of Classification Search ........ 705/35–38, 705/48; 364/400, 406
See application file for complete search history.

(56) References Cited

U.S. PATENT DOCUMENTS

| | | | | |
|---|---|---|---|---|
| 4,839,804 A | | 6/1989 | Roberts et al. ............ 364/408 |
| 5,508,731 A | * | 4/1996 | Kohorn ..................... 725/24 |
| 6,026,388 A | * | 2/2000 | Liddy et al. ................ 707/1 |
| 6,070,151 A | * | 5/2000 | Frankel .................. 705/36 R |
| 6,134,536 A | | 10/2000 | Sheperd .................... 705/37 |
| 6,304,858 B1 | * | 10/2001 | Mosler et al. .............. 705/37 |
| 6,360,210 B1 | * | 3/2002 | Wallman ................. 705/36 R |
| 6,456,982 B1 | * | 9/2002 | Pilipovic ................. 705/36 R |
| 2002/0099640 A1 | * | 7/2002 | Lange ....................... 705/37 |
| 2003/0144936 A1 | * | 7/2003 | Sloan et al. ................ 705/36 |
| 2004/0186803 A1 | * | 9/2004 | Weber et al. ............... 705/35 |

OTHER PUBLICATIONS

Successful Investing: Losses, fuel costs continue to ground TWA stock, Andrew Leckey. The Charleston Gazette. Charleston, W.V.: Nov. 6, 2000. p. 2.D.*
Int'l Search Report dated Mar. 6, 2003 for PCT/US02/16240.

* cited by examiner

Primary Examiner—Hani M. Kazimi
Assistant Examiner—Clement Graham
(74) Attorney, Agent, or Firm—Weitzman Law Offices, LLC

(57) ABSTRACT

A method and system is provided by which an entity manages an exposure to an economic risk associated with a commodity and initially includes the step of modeling the exposure to the risk using financial instruments such as forward contracts and option contracts. Next, a hedge for the exposure is executed. Liquidated cash flows, that are based on the modeled exposure and said hedge, are periodically calculated. If liquidated cash flows are positive, a payout is provided to the entity while a payout is received from the entity if the liquidated cash flows are negative. In an exemplary embodiment, the liquidated cash flows are marked to the market.

37 Claims, 5 Drawing Sheets

PORTFOLIO HEDGING METHOD

BACKGROUND

The following invention relates to a method and system for managing risk and, in particular, to a method and system for managing the risk associated with commodities and other complex financial exposures.

Business enterprises seek to accurately predict the costs of raw materials and revenues in order to monitor and manage their cash flows. For businesses that consume or produce commodities, this is a difficult task because the spot prices of commodities often change rapidly and unpredictably. For example, a manufacturer of aluminum requires a certain amount of electricity over a certain period of time, called the "budget period," to operate its manufacturing equipment to meet its aluminum production commitments during the budget period. In addition, the manufacturer also needs to know the price of the electricity required for manufacturing in order to determine its total costs for producing the aluminum. Furthermore, the manufacturer also desires to determine the value of the aluminum produced so that it can guarantee its value. Similarly, the electricity provider must determine whether it can meet the manufacturer's electricity demands, at what price and for what period of time. The electricity provider may base this determination on its cost to generate the electricity, its total obligations to provide electricity (i.e., its load) and various environmental and market factors. Because there are numerous factors that can affect the price and availability of electricity and aluminum, such as changes in demand, the weather and government regulations, both the electricity provider and the aluminum producer desire access to a predictable price for the electricity and the aluminum.

In the case of a power producer, such as an electricity provider, the production of power entails several risks. For example, power producers commonly use power production plants that are designed to be switched on and off daily, as necessary. This allows the producer to be able to operate the plant during peak periods when prices are high enough to cover variable costs, (for example, the commodity cost of fuel), while avoiding this cost by switching the plant off when prices are too low to cover such costs. For power production plants having high operating costs, this can lead to more extreme fluctuations in revenues than for other commodity producers when fuel costs and electric prices trend up or down for any extended period, as is often the case.

There are three primary strategies for dealing with the risks associated with producing, supplying and consuming commodities. In a first strategy, the producer or consumer uses equity to finance fluctuations in the cost of the particular commodity. Because equity, unlike debt, does not guarantee a regular return, the commodity price movements are absorbed by variations in any returns on the equity. Alternatively, the producer/consumer may set aside cash reserves for riding out any dips or spikes in commodity prices. The obvious drawback to this strategy is that the power provider does not have the benefit of a consistent revenue stream and the power consumer does not have a predictable cost structure. Furthermore, unused cash reserves or high equity levels are costly because the cash is not generating much income and equity carries a higher rate of return than debt.

In a second strategy, the commodity consumer or producer enters into forward contracts in which the delivery of the commodity at a future date is guaranteed at a set price. Typically, commodity producers and consumers do not enter into forward contracts directly because generally each have different objectives with respect to price, term and structure of such contracts. As a result, the commodity will either pass through a financial middleman or pass directly between the commodity producer and consumer at an index-based price so that a financial or derivative contract can be used to achieve the desired financial guarantees. Thus, by way of example, a power provider may sell the right to take the output of its power plant to a financial intermediary for a stream of fixed payments thereby locking in a return for an extended period of time. In this case, the intermediary may execute a dynamic hedging strategy involving an initial forward sale of power and purchase of fuel followed by regular additional sales or purchases of both fuel and electricity as market prices change. The hedging strategy is designed to lock in the plant return for a margin, or risk premium, above the price paid to the power provider. The risk premium is intended to compensate the intermediary for the risk that the hedging strategy may not work (strategy risk) or that the strategy may not be able to be implemented at the prices expected (execution risk). This second strategy results in disadvantages for the power provider in that the power provider has given up the risk premium and may also be contractually exposed to changes in his operating costs or plant availability.

A third common strategy involves the commodity consumer or provider assuming the role of financial intermediary and stabilizing its revenue stream using derivative products or forward contracts. In this case, the power provider models its portfolio, that includes power generating assets as well as loads and sales obligations, using forward contracts and option contracts according to well-known techniques. Based on the model portfolio, the power provider then hedges its portfolio by purchasing or selling power or raw materials through forward and option contracts using well-known techniques. If the model portfolio is accurate (strategy risk) and the hedge is purchased efficiently (execution risk), the power provider would achieve a stable and predictable revenue stream for its power.

There are also numerous disadvantages to managing commodity risks with this third strategy. First, for the power provider to achieve revenue stability using the modeling and hedging approach requires that the power provider have significant financial expertise. Furthermore, the power provider would have to continuously monitor changing market conditions and update the model portfolio and hedges accordingly. Also, in many instances, the power provider does not have the power interchange agreements in place with counterparties in order to execute the necessary hedges in a cost-effective way. Because power providers, as well as other entities that require stable access to a particular commodity, typically do not have the expertise and relationships to model and hedge their commodity positions, such an approach is often not available.

In summary, the prior art hedging technology does not enable a commodity consumer or producer to easily tailor exactly the amount of strategy risk and execution risk that is retained or laid off. Using the second strategy above, almost all the risk is laid off while in the third strategy most of the strategy and execution risk is kept. Accordingly, it is desirable to provide a method and system in which an entity may better manage its risks associated with its position in a particular commodity.

SUMMARY OF THE INVENTION

The present invention is directed to overcoming the drawbacks of the prior art. Under the present invention, a method is provided by which an entity manages an exposure to an economic risk associated with a commodity. The method includes the step of forming a model portfolio to capture the exposure. Next, a hedging portfolio for the exposure is formed. Each of the model portfolio and hedging portfolio is a set of transactions that when liquidated over time results in cash flows. Next, the cash flows of the model portfolio and the hedge portfolio are periodically combined. Finally, a payout based on the combined cash flows is provided.

In an exemplary embodiment, the model portfolio of said exposure is formed with actual and/or proxy contracts.

In another exemplary embodiment, at least one hedging transaction executed by the entity is received and the at least one hedging transaction is modeled.

In yet another exemplary embodiment, an institution records the exposure and the institution executes at least one hedging transaction.

In still yet another exemplary embodiment, the institution records the exposure by executing at least one transaction between the entity and the institution.

In an exemplary embodiment, the at least one transaction includes an actual transaction and/or a proxy transaction.

In another exemplary embodiment, the combined cash flows between said entity and the institution are exchanged.

In yet another exemplary embodiment, positive combined cash flows are paid to the entity and negative combined cash flows are received from the entity.

In still yet another exemplary embodiment, the institution retains any loss of cash flows resulting from a default.

In an exemplary embodiment, the institution retains at least a portion of any pooling profits.

In another exemplary embodiment, a benchmark representing cash flows is received from the entity and a payout based on a difference between the combined cash flows and the benchmark cash flows is provided.

In yet another exemplary embodiment, a payment to the entity is provided if the combined cash flows is less than the benchmark cash flows and a payment is received from the entity if the combined cash flows is greater than the benchmark cash flows.

In still yet another exemplary embodiment, the payment is a percentage of the difference between the combined cash flows and the benchmark cash flows.

In an exemplary embodiment, the payment is provided if the difference between the combined cash flows and the benchmark cash flows is within a band.

In another exemplary embodiment, the payment is provided if the difference between the combined cash flows and the benchmark cash flows is outside a band.

In yet another exemplary embodiment, the model portfolio and the hedging portfolio is periodically updated.

In still yet another exemplary embodiment, the cash flows of the model portfolio and hedging portfolio are combined daily.

In an exemplary embodiment, the commodity is electricity, natural gas, copper, zinc, interest rates, oil products, bandwidth and/or foreign exchange.

Under the present invention, a system by which an entity manages a portfolio of exposures to an economic risk associated with a commodity is provided and includes a portfolio modeling engine for receiving the portfolio of exposures from the entity and forming a model portfolio representing cash flows. Also included is a hedging modeling engine for receiving at least one hedging transaction and forming a hedging portfolio representing cash flows based on the at least one hedging transaction and the model portfolio. A tracking portfolio generator is included for receiving the model portfolio and the hedging portfolio and combining the cash flows of the model portfolio and the hedging portfolio. Finally, a payout manager is included for providing a payout based on the combined cash flows.

In an exemplary embodiment, the hedging modeling engine forms the hedging portfolio by receiving at least one hedging transaction executed by the entity and modeling the at least one hedging transaction.

Under the present invention, a system by which an entity manages a portfolio of exposures to an economic risk associated with a commodity is provided and includes a transaction manager for executing at least one transaction between an institution and the entity, wherein the at least one transaction forms a model portfolio representing cash flows. A hedging module is included for executing at least one hedging transaction, wherein the at least one hedging transaction forms a hedging portfolio representing cash flows. Also included is a tracking portfolio generator for receiving the model portfolio and the hedging portfolio and combining the cash flows of the model portfolio and the hedging portfolio. Finally, a payout manager is included for providing a payout based on the combined cash flows.

In an exemplary embodiment, a cash flow manager is included for exchanging the combined cash flows between the entity and the institution. Positive combined cash flows are paid to the entity and negative combined cash flows are received from the entity.

In another exemplary embodiment, the institution retains any loss of cash flows resulting from a default.

In yet another exemplary embodiment, the institution retains at least a portion of any pooling profits.

Accordingly, a method and system is provided through which an entity may finely determine how much strategy risk associated with managing its position in, or dependence on a, commodity is retained and how much is laid off.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which.

DETAILED DESCRIPTION OF THE PREFERRED EMBODIMENTS

Figure 1:
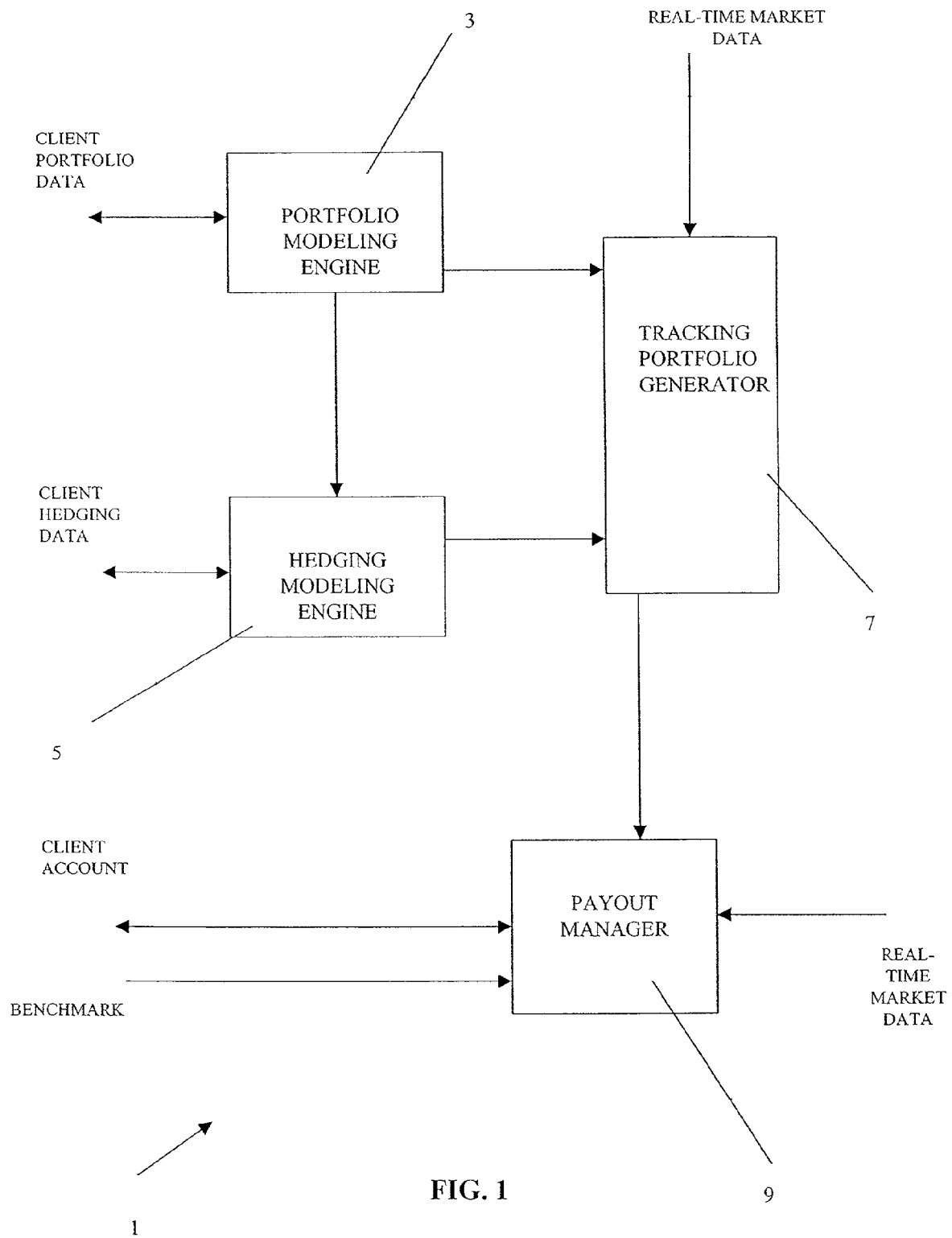
FIG. 1 is block diagram of a system by which an entity manages an exposure to an economic risk associated with a commodity, in accordance with the present invention.

Referring now to FIG. 1, there is shown a system 1 by which an entity manages an exposure to an economic risk associated with a commodity in accordance with the present invention. System 1 is generally operated by an institution that deals in the particular commodity and that has expertise in both pricing the commodity and hedging positions in the commodity. For example, the institution may be a financial institution that operates a trading desk in the particular commodity and that has in place numerous interchange agreements with third parties thereby enabling the institution to efficiently execute hedging transactions with such third parties.

The institution operates system 1 in order to help clients of the institution to manage their risks associated with the clients' exposures to particular commodities. Such clients may include, for example, a producer of aluminum whose revenue stream is dependent on the cost of producing electricity and on the prevailing value of aluminum, or a producer of refined oil products whose revenue stream is dependent on the cost of crude oil and the value of refined products produced. System 1 may be used to manage the exposure risks associated with any type of commodity including, by way of non-limiting example, gas, oil, refined products, metals and financial instruments such as foreign exchange and interest rate futures contracts. System 1 may be used to manage the risk associated with a commodity that is incurred by any entity including, by way of non-limiting example, producers, buyer, sellers and users of the commodity.

In the embodiment described in FIG. 1, the institution receives from the client a portfolio containing risk exposures associated with a particular commodity. In the case of a producer of electricity, such a portfolio may consist of various assets, such as electricity generating plants, that generate a certain amount of electricity. The portfolio may also include various contracts that represent the raw materials, such as oil and water and obligations on behalf of the power producer to provide a certain amount of electricity to certain customers over a given period of time.

Once the portfolio is received by the institution, the portfolio characteristics are input to a portfolio modeling engine 3 that is included in system 1. An example of a portfolio in the electric industry would be a tolling contract whereby the institution would receive the right to convert natural gas to electricity in exchange for the payment of a fixed monthly sum and the variable cost of the underlying power plant. Portfolio modeling engine 3 also periodically receives updates to the portfolio as changes to the client portfolio occur. For example, in the case of the tolling contract, the contract might be modified to reflect a change in the operating cost of the plant.

Portfolio modeling engine 3 then models the portfolio using proxy financial instruments (defined as transactions in which the financial institution is not a principal) that imitate the cash flows from the client portfolio. In an exemplary embodiment, the portfolio is modeled using derivatives, such as forwards and options, according to well-known techniques. For example, with respect to a portfolio that includes electricity generating plants, it is known to model a nuclear power plant that continuously produces electricity at a fixed cost as a forward contract for electricity. Dispatchable power plants (i.e. those that may be turned on and off as required), on the other hand, may be modeled using option contracts for electricity. Similarly, it is known to model the power producer's obligations to provide electricity as a series of forward and options contracts. Thus, in the case of an electricity producer's portfolio, portfolio modeling engine 3 generates a model portfolio by modeling the client portfolio using forward and options contracts according to known techniques.

An example of a portfolio being modeled using derivatives is that of a gas-fired power plant that is modeled with a strip of daily or even hourly spread options, depending on how frequently plant output may be adjusted. The cash flow from a spread option, like that of the underlying plant, is equal to the value of the electricity produced less the cost of gas and less the other variable operating costs, when this calculation is a positive number. This corresponds to when the plant is placed in operation because of favorable economics. Otherwise, the cash flow would be zero, which corresponds to when the plant is switched off. In option terminology, the value is equal to the higher of zero or any net positive spread between prevailing electricity prices and converted gas prices (i.e. the cost of converting gas to electricity) after subtracting the strike price. Similarly, portfolio modeling engine 3 applies known techniques to model any other type of portfolio that contains risk exposures relating to a particular commodity.

In an exemplary embodiment, portfolio modeling engine 3 models the portfolio using the client's actual transactions with third parties. The actual client transactions may include the actual payment obligations to the client as reflected by invoices to be paid by the client's customers for the commodity (for example, electricity) as well as invoices to be paid by the client to its suppliers of raw materials to produce the commodity (for example, gas). The client contracts therefore reflect the cash flows expected by the client as a result of its business and is used by the financial institution to model the client's portfolio.

In yet another exemplary embodiment, the model portfolio is formed using a combination of actual and proxy financial contracts. The advantage of using the actual client transactions with third parties to form the model portfolio is that actual contracts directly reflect changes in the client portfolio whereas when the portfolio is modeled using derivatives, adjustments must be made to the model portfolio to reflect such changes. For example, if the portfolio includes a power plant, actual contracts will more accurately reflect changes in power plant efficiency that is due to, for example, the plant's age, operating temperature and other factors. On the other hand, while derivatives do not imitate the subtle changes in plant efficiency, derivatives provide a reasonable representation and have the benefit of being easier to implement.

In an exemplary embodiment, portfolio modeling engine 3 is comprised of computer software that implements the functions described above. Alternatively, the functions performed by portfolio modeling engine 3 may be implemented by a person possessing the requisite skill or by a combination of computer software and human participation.

System 1 includes a hedging modeling engine 5 that receives from the client a series of hedging transactions the client has executed with third parties for hedging the risk in the client's portfolio. Hedging modeling engine 5 also receives the model portfolio generated by portfolio modeling engine 3 and, based thereon, generates a hedging portfolio that includes a set of actual and/or proxy financial contracts for hedging the client's total exposure (as represented by the model portfolio and the client's hedging transactions). Hedging modeling engine 5 uses the model portfolio and the client hedging transactions to date in conjunction with prevailing forward market conditions to determine what additional hedging activity is required in order to properly hedge the client's total exposure. This additional hedging activity then forms the hedging portfolio. For example, a hedging portfolio associated with a gas-fired power plant may include an initial forward sale of power and purchase of fuel, both in a calculated total volume less than the potential full output of the plant being tolled, followed by a dynamic strategy of regular additional sales or purchases of both fuel and electricity as market prices change. Similarly, hedging modeling engine 5 may model the hedging transactions provided by the client using any known hedging techniques. In an exemplary embodiment, the function of hedging modeling engine 5 may be implemented either entirely or partially by a trader skilled in the art of executing hedging transactions.

In an exemplary embodiment, the client provides hedging modeling engine 5 with new hedging transactions as changing market conditions dictate. For example, in the case of a power plant, if forward power prices rise or forward gas prices fall, additional gas would be purchased and power sold forward. If power prices drop or gas prices rise, gas would be sold and power purchased. Hedging modeling engine 5 then updates the hedging portfolio based on the new hedging transactions provided by the client.

In an exemplary embodiment, hedging modeling engine 5 is comprised of computer software that implements the functions described above. Alternatively, the functions performed by hedging modeling engine 5 may be implemented by a person possessing the requisite skill or by a combination of computer software and human participation.

System 1 includes a tracking portfolio generator 7 that receives the model portfolio from portfolio modeling engine 3 and the hedging portfolio from hedging modeling engine 5 and forms a tracking portfolio that is based on the model portfolio and the hedging portfolio. Each of the model portfolio and hedging portfolio generate cash flows that are calculated by tracking portfolio generator 7 using real-time market data. For example, if the model portfolio contains one transaction, an agreement to deliver 500 MWh each hour over the next three days at $100/MWh, then the cash flow to the seller on day one is 24×500×(100−actual price of power purchased). The cash flows to the seller for days two and three are calculated in a similar manner. Thus, when the model portfolio includes actual transactions, the cash flows are generated by executing such actual transactions. When the model portfolio includes proxy financial instruments, such as options, the cash flows are generated by the payment of premiums and by exercising the instruments. Tracking portfolio generator 7 then combines the model portfolio and hedging portfolio by adding/subtracting their respective cash flows thereby generating a series of tracking portfolio cash flows. Therefore, tracking portfolio cash flows are a sequence of values over time that represent the efficacy by which the hedging portfolio hedges the model portfolio. In an exemplary embodiment, tracking portfolio generator 7 combines the cash flows of the model portfolio and the hedging portfolio on a daily or weekly basis or when invoices regarding payments between the client and the financial institution are to be prepared.

In an exemplary embodiment, tracking portfolio generator 7 is comprised of computer software that implements the functions described above. Alternatively, the functions performed by tracking portfolio generator 7 may be implemented by a person possessing the requisite skill or by a combination of computer software and human participation.

A payout manager 9 is also included in system 1 and receives the tracking portfolio cash flows calculated by tracking portfolio generator 7. Payout manager 9 also receives from the client a benchmark that is a series of cash, flows that represents the client's desired financial objective in operating the client's portfolio. For example, in a gas-fired power plant, the client's financial objective may be to achieve a set stream of cash flows from the plant despite the high variability and unpredictability of gas and electric prices. Payout manager 9 measures performance of the tracking portfolio against the benchmark and then calculates a payment to be made between the client and the financial institution based on the difference between the tracking portfolio cash flows and the benchmark cash flows.

Figure 2:
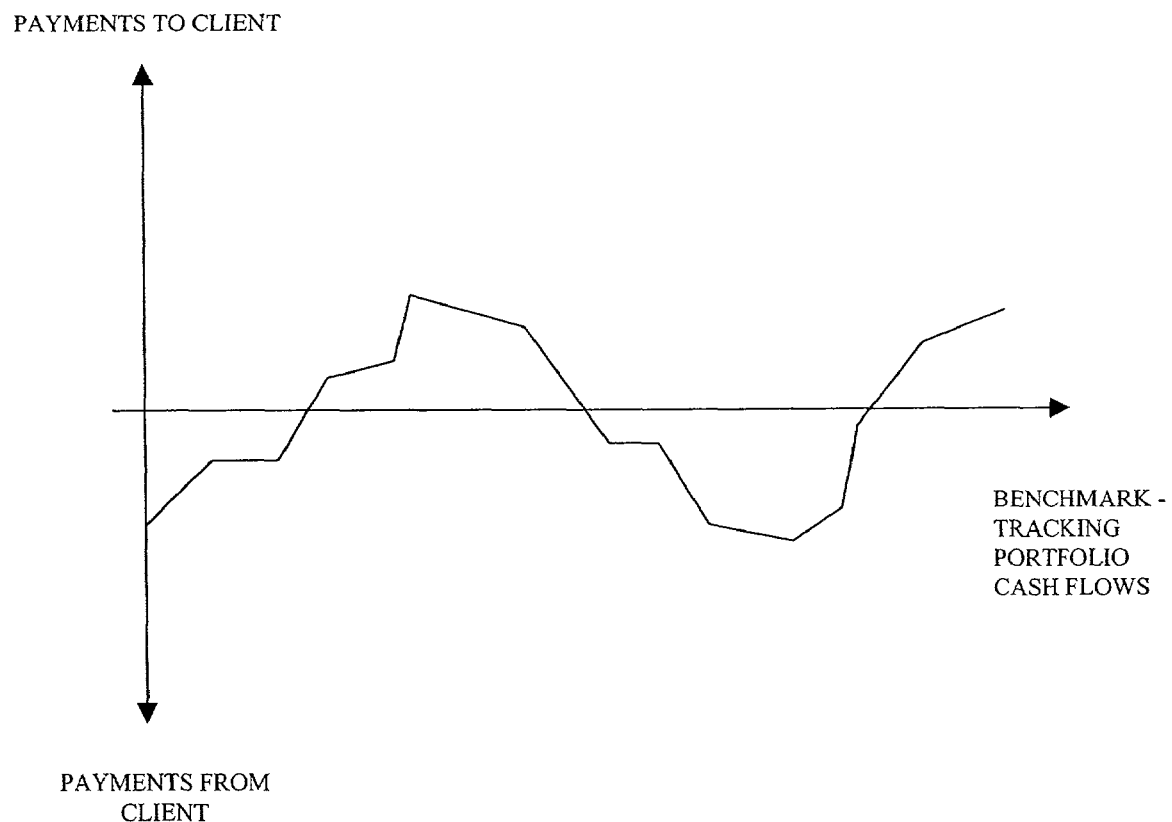
FIG. 2 is a graph depicting a payment stream between a financial institution and a client according to an exemplary embodiment.

Referring now to FIG. 2, there is shown a graph depicting a payment stream between the financial institution and the client according to an exemplary embodiment. The graph in FIG. 2 reflects payments made pursuant to an agreement between the financial institution and the client that requires the financial institution to immunize the client from all differences between the benchmark and tracking portfolio cash flows. Thus, payout manager 9 generates a set of payments to be made to the client that compensates the client for low tracking portfolio cash flows. As indicated in FIG. 2, the agreement between the financial institution and the client also requires the client to pay to the financial institution any cash flows generated by the tracking portfolio in excess of the benchmark cash flows.

In an exemplary embodiment, a payment arrangement is implemented by payout manager 9 in which the financial institution agrees to immunize the client for low tracking portfolio cash flows and receive payments for excess tracking portfolio cash flows within a defined band, for example $10M, and then share outcomes outside that band in some agreed proportion. In yet another exemplary embodiment, no payments are generated by payout manager 9 until a difference between the tracking portfolio cash flows and the benchmark cash flows are greater than a defined level, after which outcomes to the downside are shared 50/50 and outcomes to the upside are shared 75/25. It will be obvious to one of ordinary skill based on the above to have payout manager 9 generate payments streams in any other manner agreed to by the financial institution and the client.

In an exemplary embodiment, payout manager 9 is comprised of computer software that implements the functions described above. Alternatively, the functions performed by payout manager 9 may be implemented by a person possessing the requisite skill or by a combination of computer software and human participation.

In an exemplary embodiment, the functions of portfolio modeling engine 3, hedging modeling engine 5, tracking portfolio generator 7 and payout manager 9 may be implemented separately, together or in any combination thereof.

Figure 3:
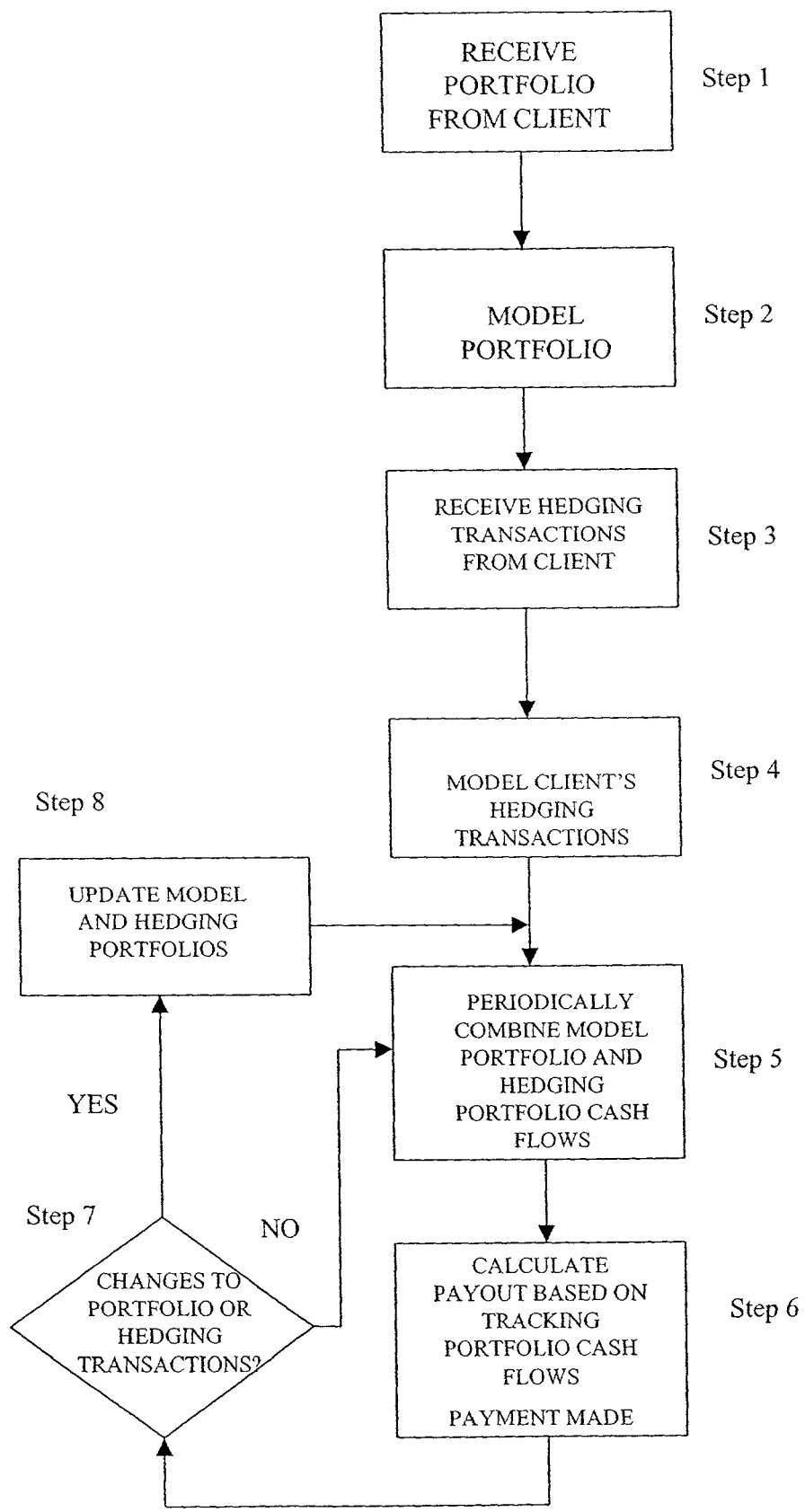
FIG. 3 is a flowchart describing the operation of the system of FIG. 1.

Referring now to FIG. 3, there is shown a flowchart showing the operation of system 1. Initially, in Step 1, the institution receives from the client a portfolio of risk exposures associated with a commodity. Next, in Step 2, the portfolio is modeled by the institution using either actual or proxy financial contracts thereby forming a model portfolio, as described above. In Step 3, the institution receives from the client the hedging transactions executed by the client to hedge its portfolio. Next, in Step 4, the hedging transactions are modeled by hedging modeling engine 11 thereby forming a hedging portfolio. Next, in Step 5, the cash flows of the model portfolio and the hedging portfolio are periodically combined thereby producing tracking portfolio cash flows. In Step 6, a payout is calculated and made based on the tracking portfolio cash flows, benchmark cash flows and according to the agreement between the financial institution and the client. Next, in Step 7, it is determined whether the assets or loads contained in the client portfolio have changed or if there are any changes with respect to the client's hedging transactions. If changes have occurred, then the model portfolio and the hedging portfolio are updated in Step 8 to reflect such changes. In either case, the method returns to Step 5 in which the tracking portfolio cash flows are again calculated at the next time interval.

In the embodiment described above, the client executes transactions to hedge its portfolio and thus acts as the counterparty to others in the financial and commodity markets in those transactions. The financial institution then tracks the client's portfolio and hedging transactions and provides the client with additional assurance of the efficacy of the hedging strategy through a payout arrangement agreed to by the parties and implemented by payout manager 9. By tracking the client's portfolio and hedging activity and calculating payments based thereon, the financial institution provides the client with several benefits. First, by entering into a payout arrangement with a financial institution, the client is provided with access to and use of the internal risk management, reporting and control systems of a competent financial institution. In addition, the client gains access to and involvement in the recommended hedging activity of the financial institution. Also, by suitably selecting a payout arrangement between the financial institution and the client, the client can achieve its desired financial objective, including but not limited to, cost or revenue certainty, accounting and tax treatment of revenues or costs or timing of costs and revenues. Furthermore, providing the client with such financial controls also facilitates the formation of joint ventures and tailored revenue sharing opportunities.

Figure 4:
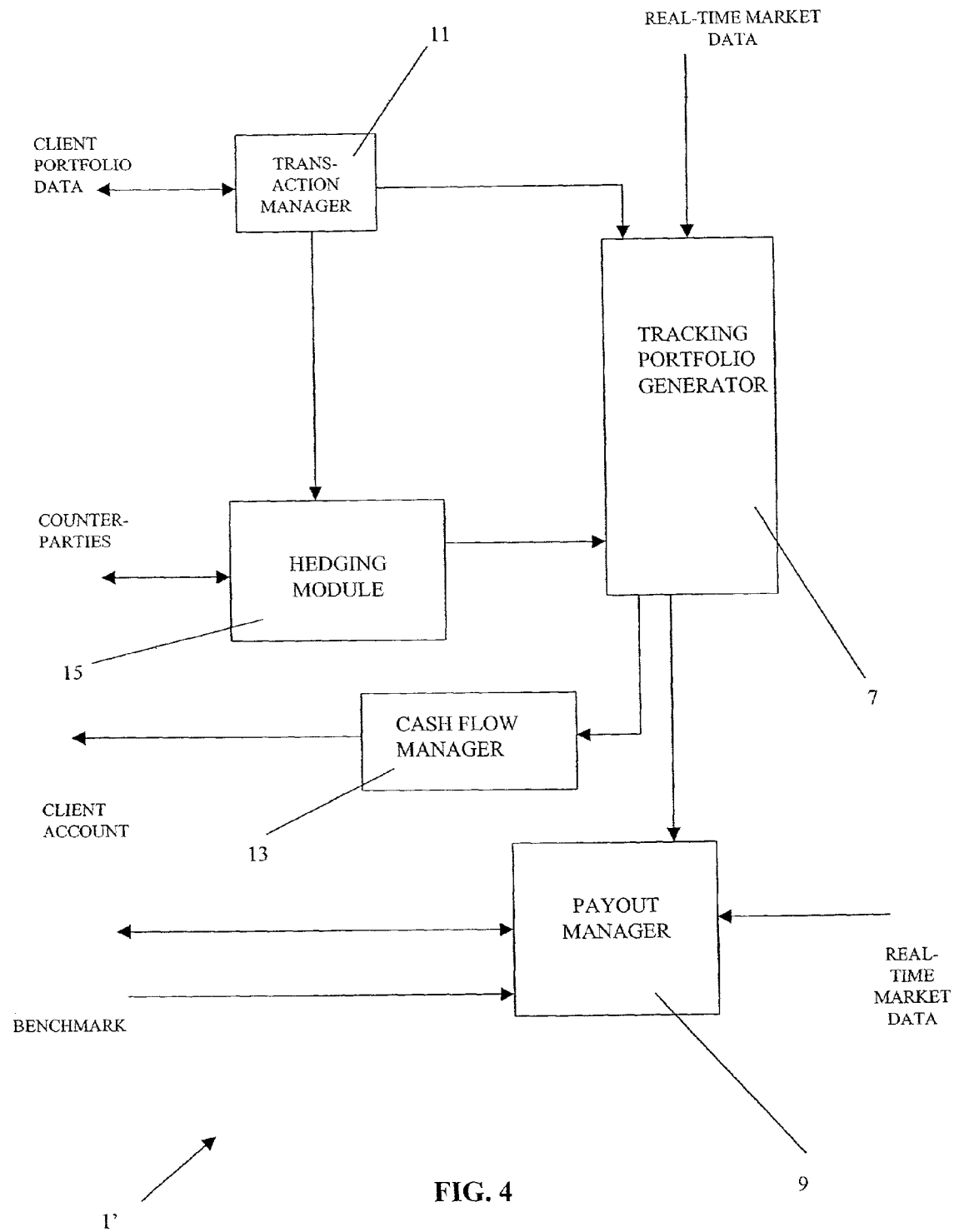
FIG. 4 is a block diagram of a system by which an entity manages an exposure to an economic risk associated with a commodity according to an alternative embodiment.

Referring now to FIG. 4, there is shown a system 1' by which an entity manages an exposure to an economic risk associated with a commodity according to an exemplary embodiment. Elements that are similar to the elements contained in FIG. 1 are identically labeled and a detailed description thereof will not be repeated.

System 1' includes a transaction manager 11 that executes a transaction, or a set of transactions, between the client and the financial institution for transferring the client's portfolio onto the books of the financial institution. These transactions may be actual transactions (in which the financial institution is a principal), proxy transactions or a combination of both. An example of using actual transactions to transfer the client portfolio to the financial institution's books includes the client selling to the financial institution its assets (for example, electricity output) and the client buying from the financial institution its fuel (for example, gas). The financial institution will then sell the purchased asset to a third party and buy the fuel from a third party. In this way, the client's actual portfolio transactions are entered into the financial institution's books thereby providing the client with various benefits including, by way of non-limiting example, access to the financial institution's counterparty list and master agreements as well as credit (netting) benefits. Alternatively, the transactions between the client and the financial institution may be proxy transactions in which the transactions are used to record the client portfolio on the financial institution's books and model the portfolio that is forwarded to tracking portfolio generator 7 (but in which the financial institution is not a principal).

Transaction manager 11 also forwards the model portfolio to a hedging module 15. Based on the model portfolio, hedging module 15 applies known techniques to execute a transaction, or series of transactions, with counterparties of the financial institution for the purpose of hedging the model portfolio. These hedging transactions form a hedging portfolio that hedging module 15 then forwards to tracking portfolio generator 7.

As in the embodiment of FIG. 1, tracking portfolio generator 7 receives the model portfolio and the hedging portfolio and forms a tracking portfolio that is a combination of model portfolio and the hedging portfolio cash flows. In particular, tracking portfolio generator 7 combines the cash flows thereby generating a series of tracking portfolio cash flows.

System 1' also includes a cash flow manager 13 that receives the tracking portfolio cash flows from tracking portfolio generator 7 and exchanges these cash flows between the client and the financial institution. For example, if the tracking portfolio cash flows are positive, then the financial institution will pay this excess cash flow to the client. If the tracking portfolio cash flows are negative, then the client will pay this cash flow shortfall to the financial institution. By exchanging cash flows in such a manner, the financial institution becomes risk neutral with respect to the client's portfolio and the hedging transactions the financial institution executed on behalf of the client (although the financial institution retains client credit risk). As a result, the financial institution is able to record the client's portfolio and associated hedging transactions on its books while remaining risk neutral with respect to the client's position.

In an exemplary embodiment, cash flow manager 13 may exchange cash flows between the client and the financial institution based on selected criteria. For example, the parties may agree that the financial institution will retain all losses associated with non-performance or default by third parties (for example, a buyer of electricity produced by the client) in which case any cash flow shortfall associated with such a default will be absorbed by the financial institution. By exchanging cash flows using such criteria, the financial institution is providing the client with credit protection.

Cash flow manager 13 may also be configured to provide the client with netting and pooling benefits. For example, if the client transacted with third parties through the financial institution and the mark-to-market value of that transaction is positive (implying the client's account is owed money by the third party), and if the financial institution has also transacted with that third party for other purposes and the mark-to-market value of that transaction is positive (implying the financial institution's account is owed money by the third party), then if the third party defaults on its obligation to pay the client and netting and closeout provisions are invoked, the client may receive payment from the third party as a result of the financial institution being able to net the transactions against each other. Netting the client's position with the financial institution's position in this manner helps the client better manage its overall portfolio and help reduce credit risk. When cash flow manager 13 exchanges cash flows between the client and the financial institution, the netting benefits would then be taken into account and the cash flow exchange would be adjusted accordingly. For example, the parties may agree that the financial institution receives half of the netting benefit provided to the client in which case the cash flow exchange is adjusted to reflect this agreement. Similarly, the cash flow exchange performed by cash flow manager 13 may be tailored in any other manner to provide the results desired by the parties.

As with the embodiment of FIG. 1, system 1' also includes payout manager 9 that receives the tracking portfolio cash flows calculated by tracking portfolio generator 7, a client benchmark and real-time market data and calculates a payment to be made between the client and the service provider based on the difference between the tracking portfolio cash flows and the benchmark cash flows.

Figure 5:
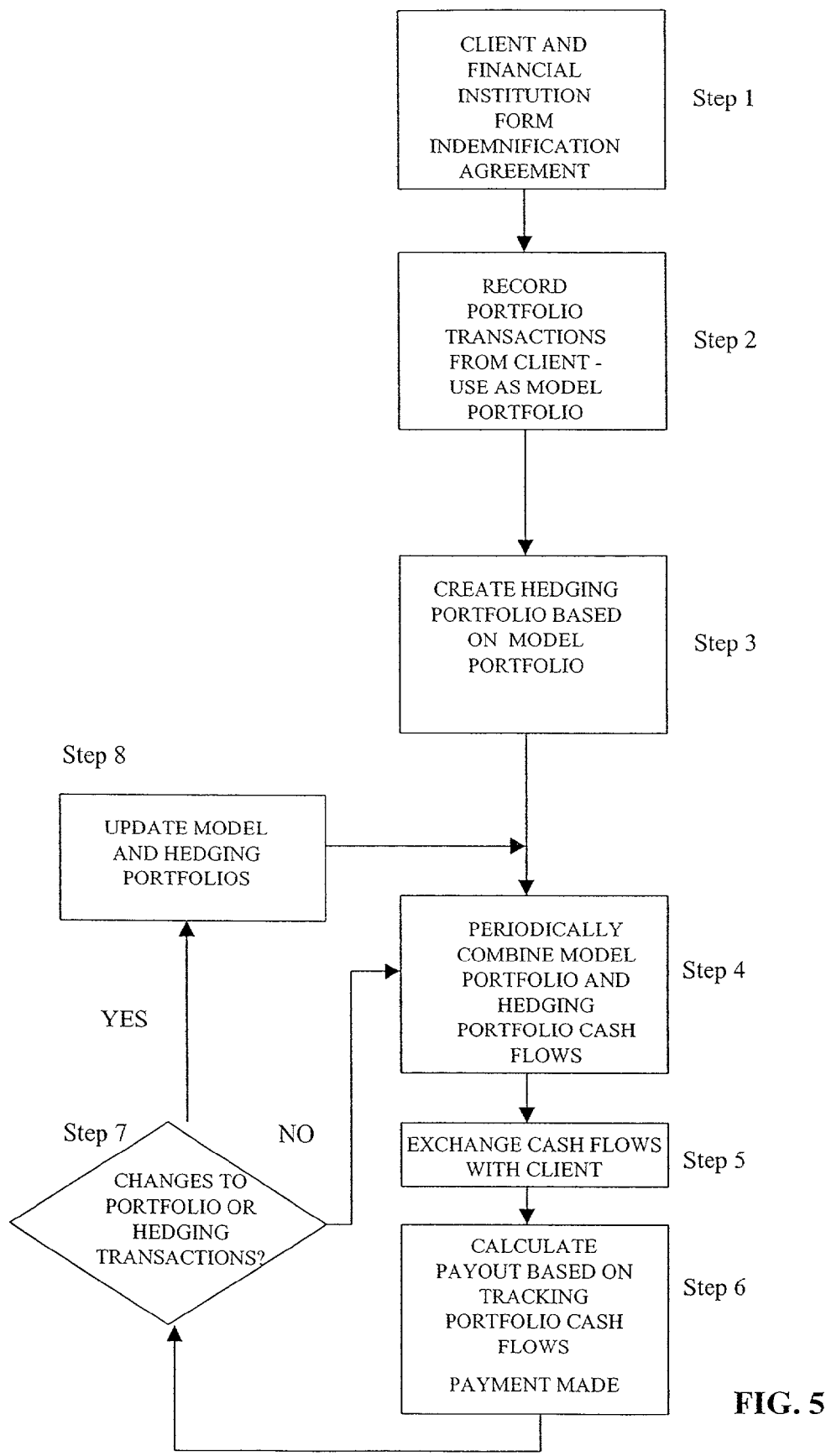
FIG. 5 is a flowchart describing the operation of the system 1 of FIG. 4.

Referring now to FIG. 5, there is shown a flowchart showing the operation of system 1' of FIG. 4. Initially, in Step 1, the client and the financial institution enter into an agreement that contains a liquidation clause in which the client indemnifies the financial institution for all cash flows of transactions in the client account. Next, in Step 2, the financial institution records a transaction, or set of transactions (actual and/or proxy) between itself and the client in the client account thereby transferring the client's portfolio to the books of the financial institution. Note that because of the indemnification agreement the client's portfolio risk has not been transferred. These transactions then constitute the model portfolio, as described above. Next, in Step 3, the institution forms a hedging portfolio by executing transactions with counterparties in order to hedge the model portfolio. Because of the indemnification agreement formed in Step 1, the payouts of these hedges accrue to the client. Next, in Step 4, the cash flows of the model portfolio and the hedging portfolio are periodically combined thereby producing tracking portfolio cash flows. Next, in Step 5, cash flows are exchanged between the financial institution and the client. For example, if the client's portfolio consists of electricity that the financial institution purchased from the client for $100 per MWh, the institution may hedge the portfolio by selling the electricity to a third party for $120 per MWh. In this example, such an exchange would result in the financial institution paying $20 per MWh ($120-$100) to the client thereby placing the financial institution in a risk neutral position, as described above. In Step 6, a payout is calculated and made based on the tracking portfolio cash flows, the benchmark and according to the agreement between the financial institution and the client. Next, in Step 7, it is determined whether the assets or loads contained in the client portfolio have changed or if there are any changes with respect to the hedging transactions. If changes have occurred, then the model portfolio and the hedging portfolio are updated in Step 8 to reflect such changes. In either case, the method returns to Step 4 in which the tracking portfolio cash flows are again calculated at the next time interval.

The embodiment of system 1' provides all the benefits that the client receives under the previous embodiment of system 1 as well as additional benefits. First, because in system 1' the financial institution records the client portfolio on its books and executes transactions to hedge the portfolio, the client gains access to the contractual relationships and counterparties of the financial institution. Because the financial institution is more likely to be active in the commodity and financial markets than the client, and therefore have superior relationships, the client will gain the benefit of the improved hedging execution that the financial institution provides. Also, because the financial institution is performing the hedging transactions, the hedging activity may be masked by having the financial institution conducting such transactions behind the more common and voluminous trading activities of the financial institution. In addition, the embodiment of system 1' provides the client with the benefits of pooling of exposures with those of the financial institution and the associated use of contractual protection such as netting and closeout provisions, as described below.

Accordingly, the present invention provides a method and system through which an entity's risk associated with its position in or dependence on a commodity may be hedged without requiring the entity to have the expertise necessary to model risk exposures and perform hedging transactions. Furthermore, under the present invention, the portfolio modeling and hedging may be performed by a financial institution that has superior expertise in modeling and hedging as well as having the necessary counter-party relations to efficiently execute the hedging transactions. By forming a tracking portfolio that tracks the strategy and exposure risk associated with the entity's hedged portfolio and issuing a payout based thereon, the entity's exposure to the risks associated with price fluctuations and availability of the commodity is modified where such modification is generally intended to reduce the risk. The present invention may also help the client (i) avoid paying the full risk premium associated with simply selling the exposure and allowing a third party to manage it, (ii) obtain access and experience in reviewing the activities of a competent institution with an eye to building internal expertise, (iii) make use of third party industry contracts and credit exposure monitoring and review of the financial institution, (iv) mask its activities in the market by flowing the client's exposures through a party with larger transaction volume, and (v) modify or achieve a particular accounting treatment for the hedging of the client's exposures.

Accordingly, a method and system is provided in which an entity may better manage its risks associated with its position in a particular commodity It will be obvious to one of ordinary skill to apply the system and method of the present invention to commodities other than electricity including, by way of non-limiting example, natural gas, copper, zinc, interest rates, oil products, bandwidth, foreign exchange and any other product or financial instrument.

Based on the above description, it will be obvious to one of ordinary skill to implement the system and methods of the present invention in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Furthermore, alternate embodiments of the invention that implement the system in hardware, firmware or a combination of both hardware and software, as well as distributing modules and/or data in a different fashion will be apparent to those skilled in the art and are also within the scope of the invention.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

The invention claimed is:

1. A computer-implemented method for managing a first entity's exposure to an economic risk associated with a commodity, comprising the steps of:
    forming, by at least one programmable processor, a model portfolio of said exposure, said model portfolio generating cash flow data;
    forming, by said at least one programmable processor, a hedging portfolio for said exposure, said hedging portfolio generating cash flow data;
    receiving, by said at least one programmable processor, benchmark cash flow data agreed to by said first entity and a second entity;
    periodically combining, by said at least one programmable processor, said cash flow data of said model portfolio and said hedging portfolio;
    calculating, by said at least one programmable processor, payout data based on a difference between said combined cash, flow data and said benchmark cash flow data and outputting, by said at least one programmable processor, the payout data representing payments to be made between the first entity and the second entity.

2. The method of claim 1, wherein the step of forming a hedging portfolio further comprises
modeling at least one hedging transaction executed by said entity.

3. The method of claim 1, wherein said step of calculating payout data based on a difference between said combined cash flow data and said benchmark cash flow data includes the steps of:
calculating a payment to be provided to said first entity if said combined cash flow data is less than said benchmark cash flow data; and
calculating a payment to be received from said entity if said combined cash flow data is greater than said benchmark cash flow data.

4. The method of claim 3, further comprising calculating said payment is as a percentage of said difference between said combined cash flow data and said benchmark cash flow data.

5. The method of claim 3, further comprising determining if said difference between said combined cash flow data and said benchmark cash flow data is within or outside a band and said payment is calculated based on whether said difference is within or outside the band.

6. The method of claim 3, further comprising determining if said difference between said combined cash flow data and said benchmark cash flow data is greater than a defined level and said payment is calculated if said difference is greater than said defined level.

7. The method of claim 1, further comprising periodically updating said model portfolio.

8. The method of claim 1, further comprising periodically updating said hedging portfolio.

9. The method of claim 1, further comprising combining on a daily basis said cash flows of said model portfolio and said hedging portfolio.

10. The method of claim 1, wherein said commodity is electricity.

11. The method of claim 1, wherein said commodity is selected from the group including natural gas, copper, zinc, interest rates, oil products, bandwidth and foreign exchange.

12. A computer system for managing a first entity's exposures to an economic risk associated with a commodity, said system comprising:
at least one programmable processor configured to:
form a model portfolio of said first entity's exposures by a portfolio modeling engine, wherein said model portfolio generates cash flow data;
form a hedging portfolio based on at least one hedging transaction of said first entity and said model portfolio by a hedging modeling engine, wherein said hedging portfolio generates cash flow data;
receive benchmark cash flow data agreed to by said first entity and a second entity;
receive said model portfolio and said hedging portfolio and combine said cash flow data of said model portfolio and said hedging portfolio by a tracking portfolio generator, wherein said tracking portfolio generator generates combined cash flow data; and
calculate payout data based on a difference between said combined cash flow data and said benchmark cash flow data by a payout manager, wherein the payout data represents payments to be made between the first entity and the second entity;
at least an input device: and
at least an output device.

13. The system of claim 12, wherein said calculated payout data represents a payment to be provided to said first entity if said combined cash flow data is less than said benchmark cash flow data and said payout data represents is a payment to be received from said first entity if said combined cash flow data is greater than said benchmark cash flow data.

14. The system of claim 13, wherein said payment is calculated as a percentage of said difference between said combined cash flow data and said benchmark cash flow data.

15. The system of claim 13, wherein said system determines if said difference between said combined cash flow data and said benchmark cash flow data is within or outside a band and said payment is calculated based on whether said difference is within or outside the band.

16. The system of claim 13, wherein said payment is provided if said difference between said combined cash data and said benchmark cash flow data is greater than a defined level and said payment is calculated if said difference is greater than said defined level.

17. The system of claim 12, wherein said model portfolio is periodically updated.

18. The system of claim 12, wherein said hedging portfolio is periodically updated.

19. The system of claim 12, wherein said cash flow data of said model portfolio and said hedging portfolio are combined daily.

20. The system of claim 12, wherein said commodity is electricity.

21. The system of claim 12, wherein said commodity is selected from the group including natural gas, copper, zinc, interest rates, oil products, bandwidth and foreign exchange.

22. A computer-implemented system by which a first entity manages a portfolio of exposures to an economic risk associated with a commodity, comprising:
at least one programmable processor configured to:
execute at least one transaction between a second entity and said first entity, said at least one transaction forming a model portfolio generating cash flow data through a transaction manager;
execute at least one hedging transaction, said at least one hedging transaction forming a hedging portfolio generating cash flow data through a hedging module;
receive benchmark cash flow data agreed to by said first entity and said second entity;
receive and combine said cash flow data of said model portfolio and said hedging portfolio through a tracking portfolio generator; and
calculate payout data based on a difference between said combined cash flow data and said benchmark cash flow data through a payout manager, wherein the payout data represents payments to be made between the first entity and the second entity;
at least an input device: and
at least an output device.

23. The system of claim 22, wherein said at least one transaction is an actual transaction.

24. The system of claim 22, wherein said at least one transaction is a proxy transaction.

25. The system of claim 22, wherein said calculated payout data represents is a payment to be made to said first entity if said combined cash flow data is less than said benchmark cash flow data and said payout data represents a payment to be received from said first entity if said combined cash flow data is greater than said benchmark cash flow data.

26. The system of claim 25, wherein said payment is calculated as a percentage of said difference between said combined cash flow data and said benchmark cash flow data.

27. The system of claim 25, wherein said system determines if said difference between said combined cash flow data and said benchmark cash flow data is within or outside a band and said payment is calculated based on whether said difference is within or outside the band.

28. The system of claim 25, wherein said payment is provided if said difference between said combined cash flow data and said benchmark cash flow data is greater than a defined level and said payment is calculated if said difference is greater than said defined level.

29. The system of claim 22, wherein said model portfolio is periodically updated.

30. The system of claim 22, wherein said hedging portfolio is periodically updated.

31. The system of claim 12, wherein said cash flow data of said model portfolio and said hedging portfolio are combined daily.

32. The system of claim 22, wherein said at least one programmable processor is further configured to determine, through a cash flow manager, cash flows to be exchanged between said first entity and said second entity based on said combined cash flow data, whereby the second entity is able to record on its books the first entity's portfolio of exposures, while remaining substantially risk neutral with respect to the first entity's exposures.

33. The system of claim 32, wherein said cash flow manager determines that when said combined cash flow data is positive, then payment of such excess cash flow is to be paid by said second entity to said first entity, and when said combined cash flow data is negative, then payment of such shortfall is to be received by said second entity from said first entity.

34. The system of claim 32, wherein said cash flow manager considers that said second entity retains any loss of cash flows resulting from a default.

35. The system of claim 32, wherein said cash flow manager considers that said second entity retains at least a portion of any pooling profits.

36. The method of claim 22, wherein said commodity is electricity.

37. The method of claim 22, wherein said commodity is selected from the group including natural gas, copper, zinc, interest rates, oil products, bandwidth and foreign exchange.

* * * * *